Oct. 10, 1933.                    C. GREENHOE                    1,930,312
                                  BEARING SEAL
                                Filed May 3, 1929

Inventor
Claude Greenhoe
By Spencer, Hardman & Fehr
His Attorneys

Patented Oct. 10, 1933

1,930,312

UNITED STATES PATENT OFFICE 1,930,312

BEARING SEAL

Claude Greenhoe, Detroit, Mich., assignor to Moraine Products Company, Dayton, Ohio, a corporation of Ohio Application May 3, 1929. Serial No. 360,035

2 Claims. (Cl. 286—11)

This invention relates to a sealing means especially adapted for preventing escape of lubricant around the bearing or housing of a relatively rotatable member, particularly for sealing such bearings on automobiles as the rear axle, transmission, universal joint and front wheel bearings.

An object of this invention is to provide a very simple and economically made sealing device, yet one which will be efficient in operation for a long period of use without attention.

A more specific object is to provide such a sealing device having a sliding contact member of porous metal capable of absorbing lubricant from the bearing adjacent thereto and thus maintaining itself properly lubricated.

Further objects and advantages of the present invention as herein disclosed, will be apparent from the following description, reference being had to the accompanying drawing, wherein a preferred embodiment of one form of the present invention is clearly shown.

In the drawing.

Similar reference characters refer to similar parts throughout the several views.

Figure 1:
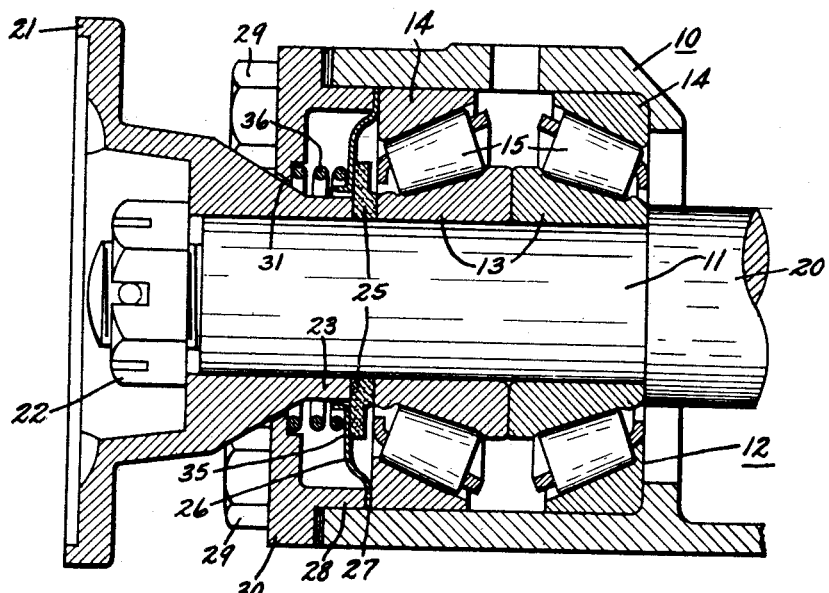
Fig. 1 is a vertical section through one embodiment of my invention and shows a rotating shaft having a tapered roller bearing support upon a stationary member and a device for sealing the opening where the shaft projects through the stationary member.

Numeral 10 designates the stationary supporting housing within which is journalled the rotating shaft 11 upon the double tapered roller bearing 12. This bearing 12 comprises two annular roller races 13 fixed to shaft 11 and two corresponding roller races 14 fixed to housing 10. The tapered rollers 15 run upon these races 13 and 14 in a well known manner, which needs no further description herein. Rotating shaft 11 has a head or collar portion 20 engaging the outer end of one of the races 13. A flange member 21 is fixed upon the other end of shaft 11 and is clamped endwise thereupon by the nut 22. The parts so far described are well known.

Now this invention provides a sealing collar 25 which is suitably fixed to shaft 11 by being clamped between the adjacent race 13 and the sleeve portion 23 of flange 21 by means of the nut 22, as will be clear from Fig. 1.

An annular sheet metal ring 26 has its outer peripheral portion 27 clamped tightly between the outer annular race 14 and the flange 28 of cap 30 which is rigidly fixed to the stationary housing 10 by bolts 29. Ring 26 is preferably made of spring metal, such as steel, and is so designed that its inner radial peripheral portion 35 is urged into sliding contact with a radial surface of sealing collar 25 by the inherent spring in the metal of ring 26. Additional spring means may be provided in the form of the coil spring 36 which seats at its left end (as viewed in Fig. 1) within a suitable recess in cap 30 and bears against the spring ring 26 at its other end and so aids in providing a pressure contact between ring 26 and collar 25. Obviously cap 30, coil spring 36 and ring 26 all remain stationary while shaft 11, flange member 21 and sealing collar 25 all rotate together, the only contact between these two groups of parts being at 35. It is thus clear that collar 25 and spring ring 26 together provide a seal which prevents lubricant from the roller bearing 12 escaping through the aperture 31 in the cap 30 and also prevents dirt or other foreign matter, solid or fluid, from entering the space within which rollers 15 are located. Obviously a like or similar sealing means may be provided at each end of a ball or roller bearing in any bearing where sealing at both ends is advantageous.

Preferably sealing collar 25 is made from a suitable porous bearing material which will absorb lubricant applied to the rollers 15 and thus automatically maintain itself properly lubricated at its radial surface in sliding contact with spring ring 26. Preferably collar 25 is of porous bronze and is made from finely divided bronze forming metals first mixed together with a small amount of material which will volatilize out in a subsequent heating. This mixture is highly compressed in suitable dies to form the ring 25 to the desired shape and the formed rings are then subjected to a sintering temperature in a non-oxidizing atmosphere to diffuse or alloy the metals and drive out the volatile material, leaving a highly porous metallic alloy structure. Examples of metals suitable for these rings 25 are fully described in Patents 1,556,658, 1,642,347 and 1,642,348.

Figure 2:
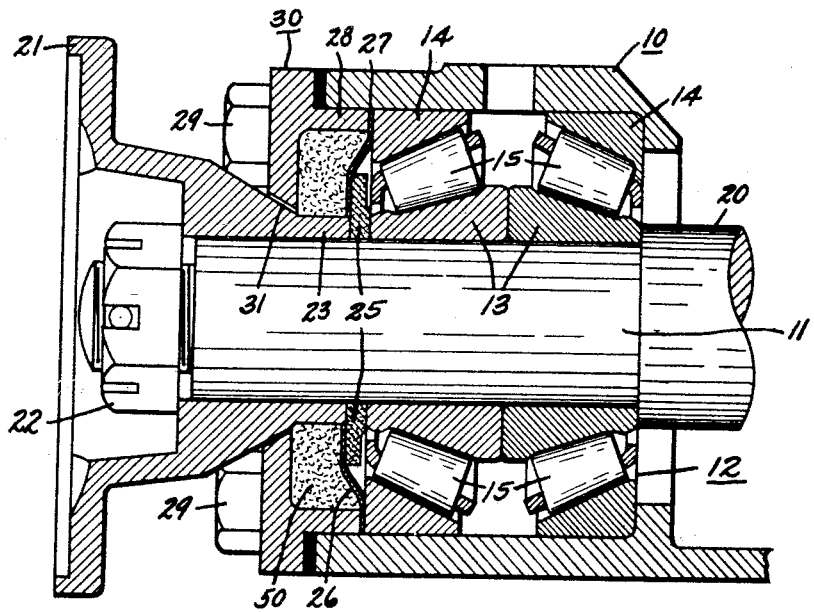
Fig. 2 is similar to Fig. 1, but shows a modified form of the sealing device.

In the form of the invention shown in Fig. 2, the steel spring ring 26 differs slightly from that shown in Fig. 1, since the spring of ring 26 itself is relied upon to maintain the sliding surfaces in pressure contact. In other words the coil spring 36 of Fig. 1 is dispensed with. In order to aid in excluding foreign matter from the roller bearing and also in preventing leakage of oil from the bearing, a suitable felt ring 50 is inserted between cap 30 and ring 26 when the parts are assembled.

Obviously this felt ring 50 prevents dust entering the space occupied thereby through the aperture 31 and so protects the seal joint to a considerable extent.

Sleeve portion 23 of flange 21 rotates in substantial contact with the stationary felt ring 50 without material friction since this felt ring 50 will be impregnated with lubricant at this point.

In both Figs. 1 and 2, the steel ring 26 can yield axially of shaft 11 sufficiently to provide for proper adjustment of the tapered roller bearing 12 without harmfully affecting its sealing contact with the sealing collar 25.

While the form of embodiment of the present invention, as herein disclosed, constitutes a preferred form, it is to be understood that other forms might be adopted, all coming within the scope of the claims which follow.

What is claimed is as follows:

1. In combination, a rotatable shaft, a supporting member embracing said shaft and a bearing therebetween, said bearing having a lubricant chamber flooded with lubricant at all times to reduce friction and wear, a lubricant-absorbing porous metal collar fixed to said shaft closely adjacent said bearing and continuously supplied with lubricant from said lubricant chamber, and a thin spring metal sealing annulus having its outer periphery fixed to said supporting member and its inner periphery pressed into direct sliding and sealing contact with said porous metal collar.

2. In combination, two relatively rotating parts and a bearing therebetween, said bearing having a lubricant chamber flooding said bearing with lubricant at all times to reduce friction and wear of said bearing, a lubricant seal for said lubricant chamber comprising a porous metal collar fixed to one of said relatively rotating parts closely adjacent said bearing and continuously supplied with lubricant from said lubricant chamber, and a spring metal disk fixed to the other of said relatively rotating parts and having a direct sliding and sealing contact upon said porous metal collar.

CLAUDE GREENHOE.